UNITED STATES PATENT OFFICE.

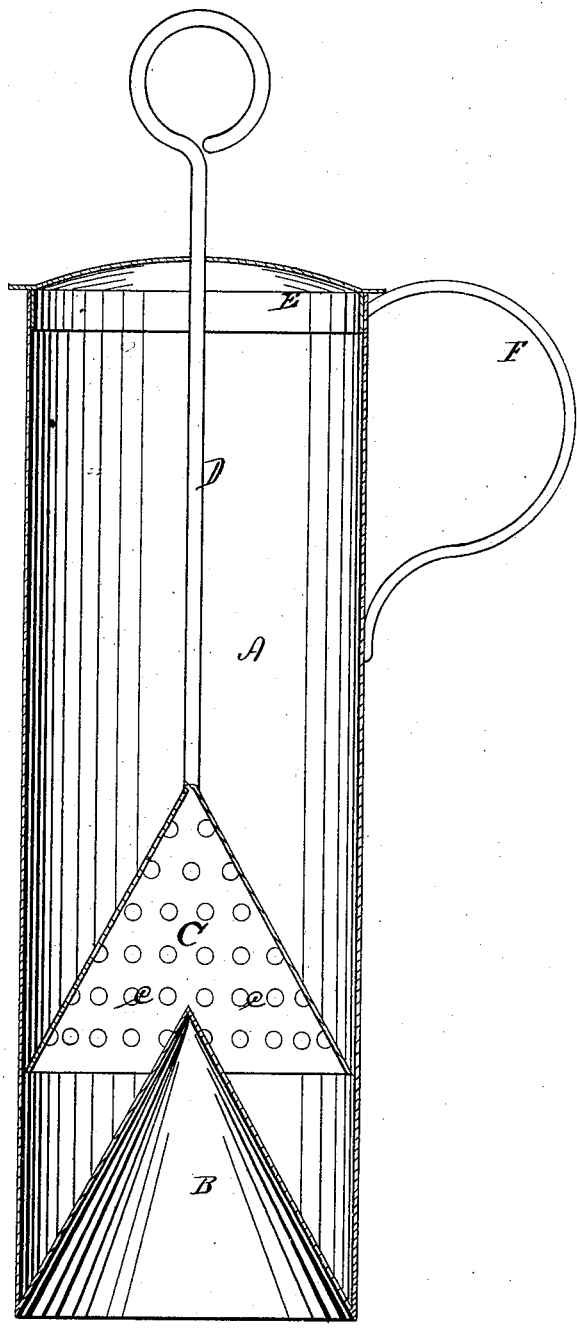

FRIEDRICH E. SCHONMEYER, OF CLEVELAND, OHIO, ASSIGNOR OF ONE-HALF HIS RIGHT TO G. B. JOHNSON, OF SAME PLACE.

IMPROVEMENT IN EGG-BEATERS.

Specification forming part of Letters Patent No. 167,696, dated September 14, 1875; application filed March 15, 1875.

*To all whom it may concern:*

Be it known that I, FRIEDRICH E. SCHONMEYER, of Cleveland, in the county of Cuyahoga and State of Ohio, have invented certain new and useful Improvements in Egg Beater or Agitator; and I do hereby declare the following to be a full, clear, and exact description of the invention, such as will enable others skilled in the art to which it pertains to make and use it, reference being had to the accompanying drawings, which form part of this specification:

My invention relates to an improved egg beater or agitator, and consists in a case for holding the egg or material to be agitated, a conical projection extending up in the said case from the bottom, and a perforated conical cap of a size to fit down over the said conical projection, the said cap being attached to a handle projecting out of the case at the top, whereby it is operated as a dasher.

In the drawing is presented a view, in longitudinal section and elevation, of an apparatus involving my invention. A is the receptacle or box, into which the egg or other substance to be agitated is received. B is the conical projection extending upward from the bottom of the said box or receptacle. C is the perforated hollow conical dasher attached to a shaft or handle, D, and extending out of the top of the receptacle. E is a suitable cover. F a handle, whereby the apparatus may be readily handled.

The operation of the device is as follows: The egg or other substance to be agitated is placed in the receptacle A; it is then agitated by the dash C. The conical form of this dash enables it to set down closely upon the conical projection B. As the dash C is pressed down the egg is, by the cone B, forced upward through the perforations $c$ in the dash C, and the egg or other substance is thoroughly cut and separated by the edges of the orifices $c$ through which it is forced. In this way eggs can be beaten very rapidly and thoroughly; and, as the cone B rests upon or is built up from the bottom of the receptacle, all parts of the contents are thoroughly agitated.

It is obvious that this invention is not limited to the beating of eggs, but is equally applicable to the churning of milk and for the mixing of liquid substances that require agitation.

So, also, instead of operating the device by the handle D directly, it is apparent that the handle D may be connected with any other mechanism, whereby it is caused to reciprocate up and down. At $e$, where the handle passes through the cover, any suitable washer or other device may be employed, so as to cause the rod D to operate smoothly.

What I claim as new is—

1. The egg beater or agitator, consisting of receptacle A, provided with cone B, hollow conical dash C, and suitable handle or shaft D, whereby the said dash is operated, substantially as and for the purpose described.

2. In an egg-beater, the combination of cone B and perforated conical dash C, substantially as and for the purpose described.

In testimony whereof I have signed my name to this specification in the presence of two subscribing witnesses.

FRIEDRICH E. SCHONMEYER.

Witnesses:
FRANCIS TOUMEY,
H. T. HOWER.